(12) United States Patent
Nakajima et al.

(10) Patent No.: US 7,115,339 B2
(45) Date of Patent: Oct. 3, 2006

(54) LITHIUM ION SECONDARY BATTERY

(75) Inventors: Junji Nakajima, Osaka (JP); Tsumoru Ohata, Kyoto (JP); Takashi Takano, Osaka (JP); Kohei Suzuki, Yao (JP); Tetsuya Hayashi, Kadoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 212 days.

(21) Appl. No.: 10/773,157

(22) Filed: Feb. 9, 2004

(65) Prior Publication Data

US 2004/0166407 A1    Aug. 26, 2004

(30) Foreign Application Priority Data

Feb. 21, 2003    (JP)    ............................. 2003-044552

(51) Int. Cl.
*H01M 2/18* (2006.01)
(52) U.S. Cl. .................. 429/231.95; 429/142; 429/129
(58) Field of Classification Search ........... 429/231.95, 429/218.1, 144, 62, 255, 142, 129
See application file for complete search history.

(56) References Cited

U.S. PATENT DOCUMENTS

| | | | |
|---|---|---|---|
| 5,882,721 A | | 3/1999 | Delnick |
| 5,948,464 A | | 9/1999 | Delnick |
| 6,846,594 B1 | * | 1/2005 | Kim et al. .................. 429/328 |
| 2002/0076619 A1 | * | 6/2002 | Yamada et al. ............. 429/324 |
| 2005/0014063 A1 | * | 1/2005 | Shi et al. .................... 429/144 |

FOREIGN PATENT DOCUMENTS

| | | |
|---|---|---|
| JP | 07-220759 | 8/1995 |
| JP | 10-106530 | 4/1998 |

* cited by examiner

*Primary Examiner*—Michael Barr
*Assistant Examiner*—Monique Wills
(74) *Attorney, Agent, or Firm*—McDermott Will & Emery LLP

(57) ABSTRACT

A lithium ion secondary battery comprising: a positive electrode, a negative electrode, a separator interposed between the positive and negative electrodes, and an electrolyte prepared by dissolving a lithium salt in a non-aqueous solvent, wherein the separator comprises a porous film layer containing basic solid particles and a composite binder, the porous film layer is adhered to at least one surface of at least one of the positive and negative electrodes, the composite binder comprises a primary binder and a secondary binder, the primary binder comprises polyether sulfone and the secondary binder comprises polyvinylpyrrolidone.

6 Claims, 2 Drawing Sheets

LITHIUM ION SECONDARY BATTERY

BACKGROUND OF THE INVENTION

In chemical batteries such as lithium ion secondary batteries, a separator is interposed between positive and negative electrodes in order to electronically insulate the electrodes and to retain an electrolyte. Currently, lithium ion secondary batteries typically utilize a separator comprising a microporous thin film made of polyolefin resin such as polyethylene.

Meanwhile, in order to enhance high rate and cycle life characteristics, proposed has been a structure in which a porous film layer is formed on at least one surface of at least one of positive and negative electrodes, instead of a conventional structure in which a microporous thin film is interposed between positive and negative electrodes (see specifications of Japanese Laid-Open Patent Publications Nos. Hei 10-106530 and Hei 7-220759, and U.S. Pat. Nos. 5,882,721 and 5,948,464). Currently known porous film layer comprises a binder made of resin material and a filler made of solid particles.

The formation of a porous film layer on at least one surface of at least one of positive and negative electrodes has such advantages as the simplification of a battery structure and that of the production process because it does not further require a separator comprising a microporous thin film. Additionally, a separator comprising a microporous thin film could be misaligned from its correct position, but such defect does not occur in the case where a porous film layer is formed on at least one surface of an electrode plate, and therefore short-circuiting is prevented.

Nevertheless, the binder is usually made of resin material, namely, polyvinylidene fluoride, a vinylidene fluoride-hexafluoropropylene copolymer, an ethylene-propylenediene monomer copolymer or a rubber-like resin. All of these resin materials do not have sufficient adherence. Therefore, in order to adhere a porous film layer onto the surface of an electrode plate, the porous film layer is required to have a relatively large amount of binder. When a relatively large amount of binder is contained in the porous film layer, the flexibility of the porous film layer becomes insufficient and thus the porous film layer is more likely to be damaged. At the same time, problems arise that the degradation of the binder greatly affects battery life and that high rate characteristics of the battery is impaired.

SUMMARY OF THE INVENTION

In view of the above, the present invention proposes a porous film layer having both superior adherence to an electrode plate and excellent flexibility. The present invention gives an excellent porous film layer even when using a small amount of binder. The present invention provides a lithium ion secondary battery comprising the aforesaid porous film layer, which is superior in high rate and cycle life characteristics.

More specifically, the present invention relates to a lithium ion secondary battery comprising a positive electrode, a negative electrode, a separator interposed between the positive and negative electrodes, and an electrolyte prepared by dissolving a lithium salt in a non-aqueous solvent, wherein the separator comprises a porous film layer containing basic solid particles and a composite binder, the porous film layer is adhered to at least one surface of at least one of the positive and negative electrodes, the composite binder comprises a primary binder and a secondary binder, the primary binder comprises polyether sulfone and the secondary binder comprises polyvinylpyrrolidone.

The basic solid particles preferably comprise at least $\alpha$-alumina.

The weight ratio between the basic solid particles and the composite binder contained in the porous film layer is preferably 96:4 to 99.5:0.5.

The positive electrode preferably comprises a lithium-containing composite oxide.

The negative electrode preferably comprises a carbonaceous material.

The weight ratio between the primary and secondary binders contained in the composite binder is preferably 1:10 to 10:1.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
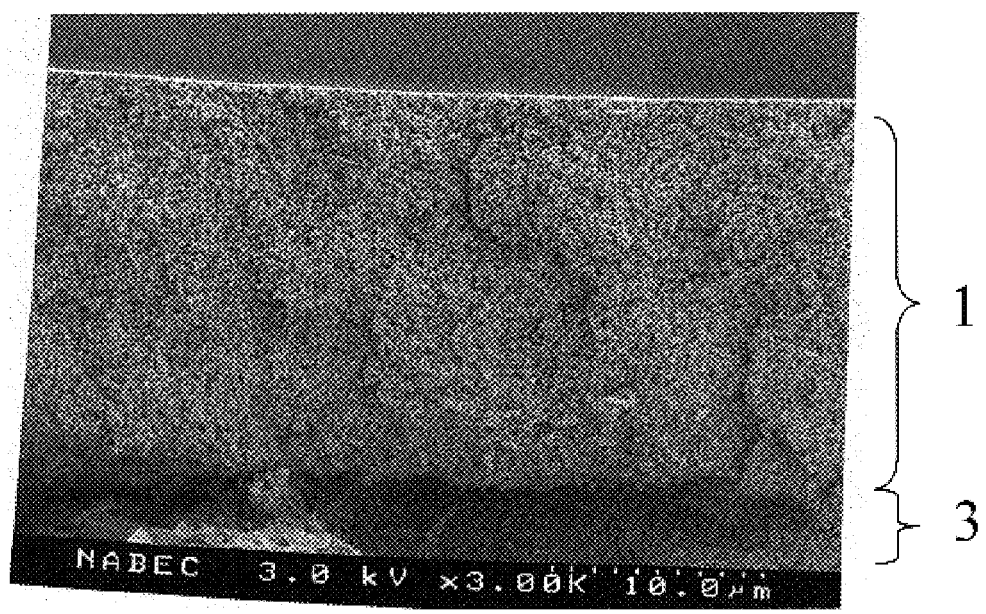
FIG. 1 is an SEM image showing a cross-section of a porous film layer made in one example of the present invention.

A lithium ion secondary battery of the present invention comprises a positive electrode, a negative electrode, a separator interposed between the positive and negative electrodes, and an electrolyte prepared by dissolving a lithium salt in a non-aqueous solvent, and the separator comprises a porous film layer adhered to at least one surface of at least one of the positive and negative electrodes. Since the negative electrode usually has a larger dimension than the positive electrode in lithium ion secondary batteries, it is preferred that the porous film layer is adhered to at least one surface of the negative electrode.

The electrodes and porous film layer are spirally wound together or stacked to form an electrode assembly. In this process, a great mechanical stress is applied to the porous film layer. When the porous film layer is adhered to at least one surface of at least one of the positive and negative electrodes, the possibilities that the porous film layer is misaligned from its correct position and that a gap is created in an electrode assembly are reduced.

The porous film layer contains basic solid particles as a filler, as well as a composite binder comprising a plurality of resin materials. The composite binder contains a primary binder comprising polyether sulfone and a secondary binder comprising polyvinylpyrrolidone. The weight average molecular weight of the polyether sulfone is not specifically limited, but preferably 10000 to 10000000. Likewise, the weight average molecular weight of polyvinylpyrrolidone is not specifically limited, but preferably 10000 to 10000000.

The primary binder comprising polyether sulfone is stable even at high electrochemical potential and has excellent size stability, thermal resistance and flame resistance. The secondary binder comprising polyvinylpyrrolidone has good flexibility and bonding property with the surface of basic solid particles. Accordingly, the composite binder comprising the above binders offers a porous film layer with excellent flexibility and adherence to an electrode plate. Such porous film layer is also superior in thermal resistance and mechanical strength.

Polyether sulfone constituting the primary binder has a defect that its binding property with the surface of basic solid particles is insufficient, although it has good bonding property with other resin materials. The secondary binder comprising polyvinylpyrrolidone serves to cover such defect and to enhance the binding property of the composite binder with the surface of basic solid particles. Polyvinylpyrrolidone has a good binding property with the surface of basic solid particles, with that of α-alumina in particular, and high affinity to polyether sulfone. Additionally, polyvinylpyrrolidone is flexible so that the workability during the construction process of an electrode assembly, which involves spiral winding and/or stacking, is improved.

Basic solid particles have the advantage that they allow lithium ion to migrate in the porous film layer faster than acidic solid particles such as silica. Details of such action are not known, but it is considered that it has something to do with the fact that lithium ion is unlikely to be trapped by the surface of basic solid particles.

Since polyvinylpyrrolidone is superior in adherence and flexibility, the use of a composite binder containing the primary binder comprising polyether sulfone and the secondary binder comprising polyvinylpyrrolidone reduces the amount of resins contained in the porous film layer. The weight ratio between the basic solid particles and the composite binder contained in the porous film layer is preferably 96:4 to 99.5:0.5.

In an especially preferred embodiment, only small amount of the composite binder is necessary. This can maximize the surface physical properties of basic solid particles that they allow lithium ion to migrate faster in the porous film layer. As a result, high rate characteristics of a lithium ion secondary battery are improved. If the weight ratio of the composite binder is greater than the preferred range, the percentage of the surface of the basic solid particles covered with the binder will be higher, reducing the effect of enhancing the high rate characteristics of the lithium ion secondary battery. Conversely, if the weight ratio of the composite binder is smaller than the preferred range, the strength of the porous film layer will be decreased accordingly.

Preferably, the weight ratio of the primary and secondary binders contained in the composite binder is 1:10 to 10:1. If the ratio of the primary binder is too large and that of the secondary binder is too small, the porous film layer will be rigid and less flexible. On the other hand, if the ratio of the primary binder is too small and that of the secondary binder is too large, the strength of the porous film layer will be low.

As the basic solid particles, a basic ceramic material such as magnesium oxide, aluminum oxide or titanium oxide can be used. Among them, particularly preferred is α-alumina or anatase-type titanium oxide because they are effective in allowing lithium ions to migrate. Additionally, the pH of the surface of the basic solid particles is preferably greater than 7 and not greater than 12.

In the case of using the titanium oxide, although the low rate characteristics of the battery are slightly lower than those in the case of using α-alumina, the high rate characteristics are improved. The cause thereof is not clear, but it is presumably because the titanium oxide can form a porous film layer with a high porosity due to the strong repulsion between particles and to the effect of form factors. As a result, the resistance of the porous film layer to ion conductivity becomes low.

In the case of using α-alumina, the BET specific surface area of the basic solid particles is preferably not less than 0.9 $m^2/g$, more preferably not less than 1.5 $m^2/g$, for the purpose of facilitating the impregnation of the electrode assembly with an electrolyte and enhancing the battery performance and the cycle life characteristics. If the BET specific surface area is less than 0.9 $m^2/g$, the adhesion between the composite binder and α-alumina will be low, and the strength of the porous film layer will be reduced. Likewise, for the purpose of preventing α-alumina from aggregating and optimizing the fluidity of the material paste for the porous film layer, the BET specific surface area should not be too large, and preferably not greater than 150 $m^2/g$. Further, the mean particle size (median diameter) of α-alumina is preferably 0.1 to 5 μm.

In the case of using the titanium oxide, the particle size of the titanium oxide is preferably not greater than 0.5 μm for the purpose of equalizing the diameters of pores in the porous film layer as well as the distribution thereof. Further, the titanium oxide powders preferably have a mean particle size (median diameter) of 0.04 to 0.5 μm.

The thickness of the porous film layer is not specifically limited, but preferably 5 to 30 μm, in order to provide a sufficient function as the separator and to maintain the designed capacity of the battery.

The positive electrode can be made of any conventionally known positive electrode material, but it is preferred that the positive electrode contains a lithium-containing composite oxide as the active material. Preferred examples of the lithium-containing composite oxide include lithium-cobalt oxides, lithium-nickel oxides and lithium-manganese oxides. The positive electrode is typically produced by first preparing a positive electrode material mixture containing an active material, a conductive material and a resin binder, which is then applied onto both faces of a current collector.

The negative electrode can be made of any conventionally known negative electrode material, but it is preferred that the negative electrode comprises a carbonaceous material. Preferred examples of the carbonaceous material include artificial graphite and natural graphite. The negative electrode is typically produced by first preparing a negative electrode material mixture containing a carbonaceous material and a resin binder, which is then applied onto both faces of a current collector.

Now, the present invention is specifically described based on EXAMPLEs. In EXAMPLEs and COMPARATIVE EXAMPLE given below, cylindrical lithium ion secondary batteries were produced and the obtained batteries were evaluated in terms of high rate and cycle life characteristics.

EXAMPLE 1

(1) Production of Positive Electrode

A positive electrode material mixture containing 85 parts by weight of powdered lithium cobalt oxide, 10 parts by weight of powdered carbon as a conductive material and 5 parts by weight of polyvinylidene fluoride as a resin binder was dispersed or dissolved in dehydrated N-methyl-2-pyrrolidone (NMP) to give a positive electrode slurry. The resultant positive electrode slurry was applied onto a positive electrode current collector made of aluminum foil, which was then dried to form a positive electrode material mixture layer, and rolled to give a positive electrode.

(2) Production of Negative Electrode

Artificial graphite powder was used as a negative electrode active material. A negative electrode material mixture containing 95 parts by weight of artificial graphite powder and 5 parts by weight of polyvinylidene fluoride as a resin binder was dispersed or dissolved in dehydrated NMP to give a negative electrode slurry. The resultant negative electrode slurry was applied onto a negative electrode current collector made of copper foil, which was then dried to form a negative electrode material mixture layer, and rolled to give a negative electrode.

(3) Preparation of Material Paste for Porous Film Layer

A mixture comprising the following composition was prepared in an amount of 100 g, which was then stirred and mixed for 30 minutes by a mixer (Rentaro MX201 available from Thinky Corporation) to give a material paste for porous film layer.

[Composition]

| | |
|---|---|
| α-alumina | 96 parts by weight |
| polyether sulfone | 1.6 parts by weight |
| polyvinylpyrrolidone | 2.4 parts by weight |
| NMP | 100 parts by weight |

α-alumina used is commercially available from Sumitomo Chemical Co., Ltd. under the trade name of AKP50 (with a pH of 9 and a BET specific surface area of about 10 $m^2/g$). Polyether sulfone used is commercially available also from Sumitomo Chemical Co., Ltd. under the trade name of Sumikaexcel PES5003P. Polyvinylpyrrolidone used is commercially available from BASF Japan Ltd. under the trade name of LUVITEC-K90.

The pH of α-alumina was measured by boiling extraction glass electrode method according to JIS-R6129-1976 and JISZ8802-1984. The pH thereof was also measured by ELS-8000, a commercially available pH titration apparatus manufactured by Otsuka Electronics Co., Ltd.

The BET specific surface area of α-alumina was determined by BET single-point method with the use of a direct-reading specific surface area analyzer. First, 0.5 to 1 g of α-alumina sample placed in a glass cell was cleaned at 250° C. for 20 to 30 minutes with a carrier gas mixture of nitrogen and helium having a volume ratio $N_2$:He of 30:70 admitted thereinto. Then, the α-alumina sample was cooled by liquid nitrogen so that $N_2$ in the carrier gas was adsorbed on the α-alumina sample. The α-alumina sample was then brought to room temperature. The amount of $N_2$ desorbed was measured by a thermally conductive type detector, and a specific surface area was calculated by dividing the surface area corresponding to the amount of desorbed $N_2$ by the weight of the sample after the measurement. NOVA 2000 manufactured by Yuasa Ionics Co., Ltd. was used for the calculation.

(4) Adhesion of Porous Film Layer to Electrode Plate Surface

The material paste for porous film layer was applied onto both faces of the negative electrode by comma-roll direct coating such that the coat on each face has a thickness of 20 µm after drying, which was then dried with hot air at 100° C. for about 15 minutes. Thereby, a negative electrode having porous film layers on both faces thereof was produced.

Figure 2:
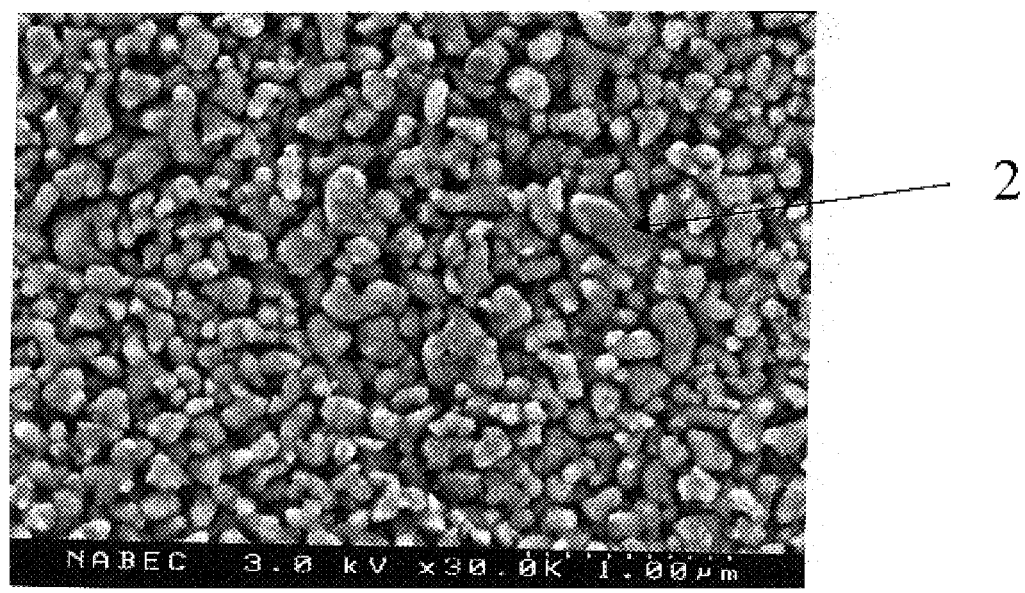
FIG. 2 is an enlarged image of a relevant part of FIG. 1.

The cross-section of the negative electrode having porous film layers on both faces thereof was observed by a scanning electron microscope (SEM). The obtained SEM image (with a magnification of 3000) is shown in FIG. 1, and an enlarged image of a relevant part of FIG. 1 (with a magnification of 30000) is shown in FIG. 2. These images have indicated that the porous film layer 1 with solid particles 2 filled therein was formed on the surface of the negative electrode material mixture layer 3.

(5) Preparation of Non-Aqueous Electrolyte

A non-aqueous electrolyte was prepared by dissolving $LiPF_6$ as a lithium salt in a non-aqueous solvent mixture comprising ethylene carbonate (EC) and ethyl methyl carbonate (EMC) at a volume ratio of 1:1 at a $LIPF_6$ concentration of 1 mol/liter.

(6) Assembly of Battery

The positive electrode was combined with the negative electrode having porous film layers on both faces thereof, which was then spirally wound to give a cylindrical electrode assembly. The obtained electrode assembly was housed in a cylindrical can case for a battery. Then, about 3.8 ml of the electrolyte was injected into the battery case to impregnate the electrode assembly with the electrolyte. Finally, the opening of the battery case was sealed to give a cylindrical battery with a diameter of 18 mm and a height of 65 mm. The produced cylindrical battery had a nominal capacity of 2000 mAh.

EXAMPLE 2

A battery was produced in the same manner as in EXAMPLE 1 except that a material paste for porous film layer with a composition shown below was used.

| | |
|---|---|
| α-alumina | 99.5 parts by weight |
| polyether sulfone | 0.1 part by weight |
| polyvinylpyrrolidone | 0.4 part by weight |
| NMP | 100 parts by weight |

COMPARATIVE EXAMPLE 1

A battery was assembled in the same manner as in EXAMPLE 1 except that the negative electrode had no porous film layer formed thereon and a microporous film made of polyethylene with a thickness of 25 µm was used as a separator.

EXAMPLE 3

A battery was produced in the same manner as in EXAMPLE 1 except that a material paste for porous film layer with a composition shown below was used.

| | |
|---|---|
| α-alumina | 95 parts by weight |
| polyether sulfone | 2 parts by weight |
| polyvinylpyrrolidone | 3 parts by weight |
| NMP | 100 parts by weight |

COMPARATIVE EXAMPLE 2

A material paste for porous film layer was prepared in the same manner as in EXAMPLE 1 except that the composition was altered as follows.

| | |
|---|---|
| α-alumina | 96 parts by weight |
| polyether sulfone | 4 parts by weight |
| polyvinylpyrrolidone | 0 part by weight |
| NMP | 100 parts by weight |

With the use of the resultant material paste, porous film layers were formed on both faces of the negative electrode. Then, the production of an electrode assembly was attempted in the same manner as in EXAMPLE 1, but the porous film layers were inflexible and rigid so that the process of spiral winding was unable to be carried out. Presumably, this is because, in this example, polyvinylpyrrolidone was not used and only polyether sulfone was used so that the porous film layers did not gain enough flexibility.

COMPARATIVE EXAMPLE 3

A material paste for porous film layer was prepared in the same manner as in EXAMPLE 1 except that the composition was altered as follows.

| | |
|---|---|
| α-alumina | 96 parts by weight |
| polyether sulfone | 0 part by weight |
| polyvinylpyrrolidone | 4 parts by weight |
| NMP | 100 parts by weight |

With the use of the resultant material paste, porous film layers were formed on both faces of the negative electrode. Then, the production of an electrode assembly was attempted in the same manner as in EXAMPLE 1, but the porous film layers were brittle and likely to come off so that the process of spiral winding was unable to be carried out. Presumably, this is because, in this example, polyether sulfone was not used and only polyvinylpyrrolidone was used so that the porous film layers did not gain enough strength.

COMPARATIVE EXMAPLE 4

A material paste for porous film layer was prepared in the same manner as in EXAMPLE 1 except that the composition was altered as follows.

| | |
|---|---|
| α-alumina | 96 parts by weight |
| polyether sulfone | 0 part by weight |
| polyvinylpyrrolidone | 0 part by weight |
| polyvinylidene fluoride | 4 parts by weight |
| NMP | 100 parts by weight |

With the use of the resultant material paste, porous film layers were formed on both faces of the negative electrode. Then, the production of an electrode assembly was attempted in the same manner as in EXAMPLE 1, but the porous film layers were brittle and likely to come off so that the process of spiral winding was unable to be carried out. Presumably, this is because, in this example, polyvinylidene fluoride was used instead of polyvinylpyrrolidone and polyether sulfone so that the porous film layers did not gain enough strength.

EXAMPLE 4

A battery was produced in the same manner as in EXAMPLE 2 except that a material paste for porous film layer with a composition shown below was used.

| | |
|---|---|
| titanium oxide | 99.5 parts by weight |
| polyether sulfone | 0.1 part by weight |
| polyvinylpyrrolidone | 0.4 part by weight |
| NMP | 100 parts by weight |

Titanium oxide used is commercially available from Fuji Titanium Industry Co., Ltd. under the trade name of TA300 (with a pH of 8 and a BET specific surface area of 8 $m^2/g$). The pH and BET specific surface area of titanium oxide were determined in the same manner as those of α-alumina were.

EXAMPLE 5

A material paste for porous film layer was prepared in the same manner as in EXAMPLE 1 except that the composition was altered as follows.

| | |
|---|---|
| α-alumina | 98.8 parts by weight |
| polyether sulfone | 1 part by weight |
| polyvinylpyrrolidone | 0.2 part by weight |
| NMP | 100 parts by weight |

[Battery Evaluation]

Only batteries which were able to be completed due to successful production of electrode assemblies (i.e. batteries of EXAMPLEs 1 to 5 and COMPARATIVE EXAMPLE 1) were evaluated in terms of the following characteristics.

<1> High Rate Discharge Characteristics

At an ambient temperature of 20° C., each battery was put through 10 cycles of the charge and discharge as shown below. The discharge capacity obtained after 10 cycles was refer to as "initial capacity". It was confirmed that the initial capacity of all of the batteries satisfied the nominal capacity at 1 C rate discharge.

(1 C Rate Discharge)
   Constant current charge: 2000 mA (end voltage of 4.2 V)
   Constant voltage charge: 4.2 V (end current of 100 mA)
   Constant current discharge: 2000 mA (end voltage of 2.5 V)

Then, at an ambient temperature of 20° C., each battery was respectively put through the 5 patterns of charge/discharge cycles shown below. The discharge capacities obtained at each discharge rate are shown in Table 1, relative to the discharge capacity obtained at 0.2 C rate of 100%.

(0.2 C Rate Discharge)
   Constant current charge: 2000 mA (end voltage of 4.2 V)
   Constant voltage charge: 4.2 V (end current of 100 mA)
   Constant current discharge: 400 mA (end voltage of 2.5 V)

(2 C Rate Discharge)
   Constant current charge: 2000 mA (end voltage of 4.2 V)
   Constant voltage charge: 4.2 V (end current of 100 mA)
   Constant current discharge: 4000 mA (end voltage of 2.5 V)

(3 C Rate Discharge)
   Constant current charge: 2000 mA (end voltage of 4.2 V)
   Constant voltage charge: 4.2 V (end current of 100 mA)
   Constant current discharge: 6000 mA (end voltage of 2.5 V)

(4 C Rate Discharge)
   Constant current charge: 2000 mA (end voltage of 4.2 V)

Constant voltage charge: 4.2 V (end current of 100 mA)
Constant current discharge: 8000 mA (end voltage of 2.5 V)
(5 C Rate Discharge)
Constant current charge: 2000 mA (end voltage of 4.2 V)
Constant voltage charge: 4.2 V (end current of 100 mA)
Constant current discharge: 10000 mA (end voltage of 2.5 V)

TABLE 1

| Discharge | Discharge Capacity (%) | | | | | |
|---|---|---|---|---|---|---|
| Rate (C) | Ex. 1 | Ex. 2 | Ex. 3 | Ex. 4 | Ex. 5 | Comp. Ex. 1 |
| 0.2 | 100 | 100 | 100 | 100 | 100 | 100 |
| 1 | 99.5 | 99.7 | 99.1 | 99.7 | 99.7 | 98.6 |
| 2 | 98.9 | 99.1 | 97.9 | 99.3 | 99.2 | 97.4 |
| 3 | 95.4 | 95.7 | 89.4 | 95.9 | 95.6 | 89.1 |
| 4 | 90.2 | 91.4 | 81.1 | 92.8 | 91.3 | 79.5 |
| 5 | 84.3 | 86.1 | 71.3 | 88.0 | 86.0 | 69.3 |

<2> Cycle Life Characteristics

At an ambient temperature of 20° C., each battery was put through the charge and discharge cycles as shown below. Table 2 shows the discharge capacities of each battery obtained after 50, 100, 200, 300, 500, 750 and 1000 cycles in capacity retention ratios, relative to the initial capacity of 100%.
(1 C Rate Discharge)
Constant current charge: 2000 mA (end voltage of 4.2 V)
Constant voltage charge: 4.2 V (end current of 100 mA)
Constant current discharge: 2000 mA (end voltage of 2.5 V)

TABLE 2

| Cycle Numbers | Capacity Retention Ratio (%) | | | | | |
|---|---|---|---|---|---|---|
| (cycles) | Ex. 1 | Ex. 2 | Ex. 3 | Ex. 4 | Ex. 5 | Comp. Ex. 1 |
| 0 | 100 | 100 | 100 | 100 | 100 | 100 |
| 50 | 101.3 | 101.7 | 99.3 | 102.1 | 101.6 | 99.1 |
| 100 | 99.7 | 100.3 | 98.9 | 100.1 | 99.1 | 98.4 |
| 200 | 99.2 | 99.6 | 95.3 | 99.7 | 99.4 | 94.6 |
| 300 | 98.9 | 99.4 | 89.9 | 99.6 | 99.2 | 88.4 |
| 500 | 93.8 | 95.2 | 83.4 | 95.4 | 94.0 | 80.2 |
| 750 | 89.1 | 92.6 | 78.7 | 93.1 | 90.7 | 76.4 |
| 1000 | 83.6 | 85.4 | 68.1 | 86.0 | 84.0 | 65.3 |

As is clear from Tables 1 and 2, the batteries of EXAMPLEs 1 to 5 were superior in both high rate and cycle life characteristics to the battery of COMPARATIVE EXAMPLE 1.

Besides, the batteries of EXAMPLEs were not required to have a separator comprising a microporous film and therefore the process for battery production was simplified, leading to increased productivity.

A conventional separator has a lower production yield because a separator with pores randomly dispersed therein is likely to be produced. The porous film layer of the present invention, however, has solid particles filled therein so that pores are unlikely to be randomly dispersed therein, leading to higher production yield.

As described above, according to the present invention, a lithium ion secondary battery superior in high rate and cycle life characteristics can be efficiently produced.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:
1. A lithium ion secondary battery comprising:
(a) a positive electrode;
(b) a negative electrode;
(c) a separator interposed between said positive electrode and said negative electrode; and
(d) an electrolyte comprising a lithium salt and a non-aqueous solvent dissolving said lithium salt,
wherein said separator comprises a porous film layer, said porous film layer comprising basic solid particles and a composite binder, and being adhered to at least one surface of at least one of said positive electrode and said negative electrode,
said composite binder comprises a primary binder and a secondary binder,
said primary binder comprises polyether sulfone and
said secondary binder comprises polyvinylpyrrolidone.
2. The lithium ion secondary battery in accordance with claim 1, wherein said basic solid particles comprise at least α-alumina.
3. The lithium ion secondary battery in accordance with claim 1, wherein the weight ratio between said basic solid particles and said composite binder contained in said porous film layer is 96:4 to 99.5:0.5.
4. The lithium ion secondary battery in accordance with claim 1, wherein said positive electrode comprises a lithium-containing composite oxide.
5. The lithium ion secondary battery in accordance with claim 1, wherein said negative electrode comprises a carbonaceous material.
6. The lithium ion secondary battery in accordance with claim 1, wherein the weight ratio between said primary binder and said secondary binder contained in said composite binder is 1:10 to 10:1.

* * * * *